Aug. 17, 1965   H. MARTIN ETAL   3,201,723
CORRUGATED WAVEGUIDES
Filed May 14, 1963
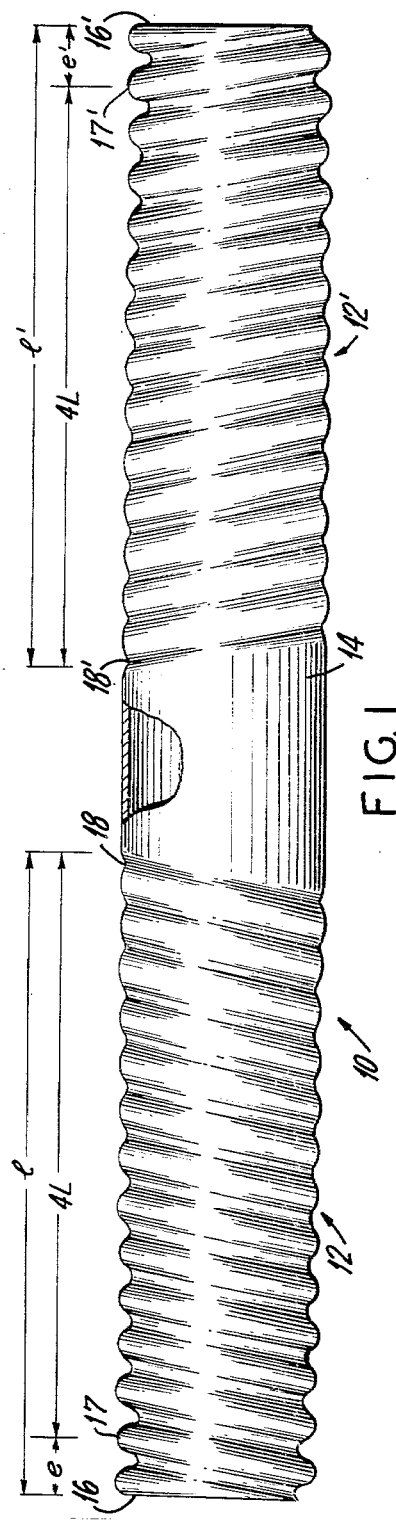
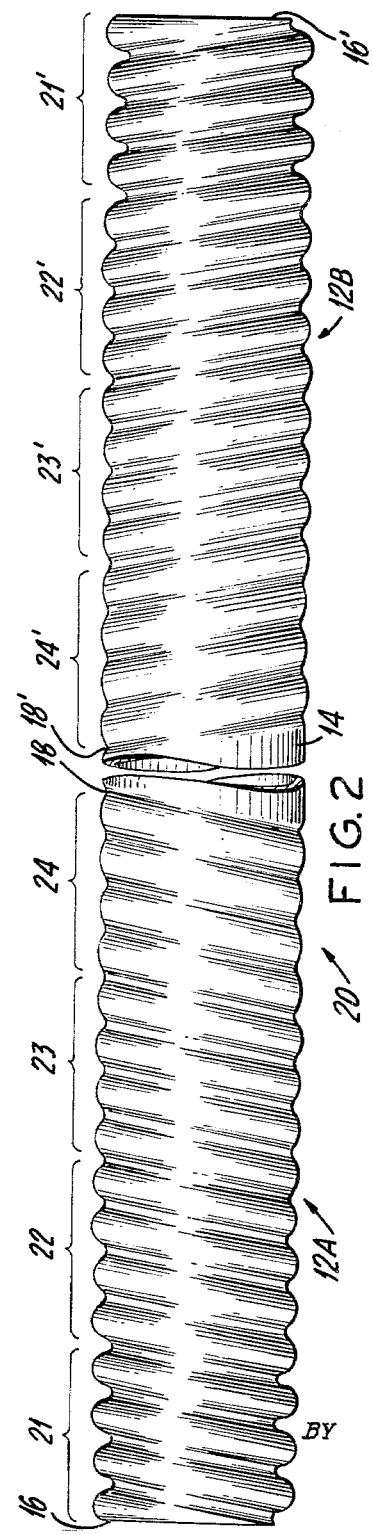
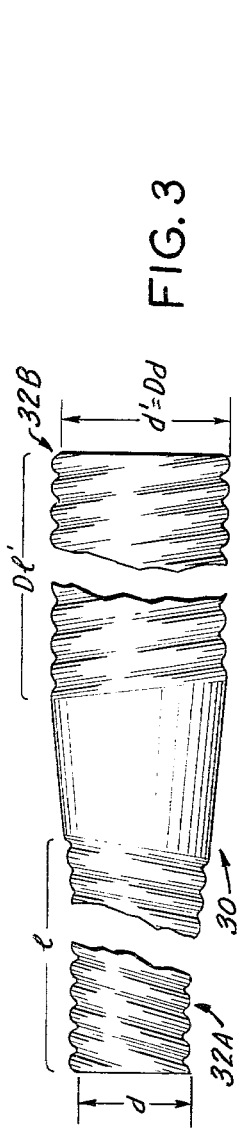
INVENTORS.
HELMUT MARTIN
GUNTER MOHRING
BY
*Philip G. Hilbert*
ATTORNEY.

United States Patent Office 3,201,723
Patented Aug. 17, 1965

3,201,723
CORRUGATED WAVEGUIDES
Helmut Martin, Hannover, and Günter Möhring, Langenhagen, Hannover, Germany, assignors to Hackethal Draht- und Kabel-Werke Aktiengesellschaft, Hannover, Germany
Filed May 14, 1963, Ser. No. 280,314
9 Claims. (Cl. 333—95)

This invention relates to waveguides and more particularly concerns waveguides of the corrugated tubular type.

Corrugated tubular members have been used as waveguides for the transmission of electromagnetic waves and are preferred to smooth walled tubular members because they can be bent to a greater extent than the smooth tubes, without substantially changing the cross-section thereof.

It is known however, that in helically corrugated tubes, the plane of polarization of the transmitted electromagnetic wave is subjected to rotation which can be expressed in degrees per meter of guide length. Accordingly, a frequency-dependent additive component depending on the pitch and shape of the helix is introduced into the transmitted wave. Therefore, for a waveguide of a selected length receiving a wave with a certain orientation of the plane of polarization at the input, there will be a different amount of rotation of the plane of polarization for every frequency component of the wave when it reaches the output end of the guide.

However, even when operating with a single frequency or operating wavelength, the minimum length of the waveguide must be extended in order to obtain a predetermined orientation of the plane of polarization at the output.

It is a general object of this invention to provide an improved waveguide.

Another object of this invention is to provide an improved corrugated waveguide which minimizes the effects on the rotation of the plane of polarization of the electromagnetic energy introduced by the helically corrugated wall structure of the waveguide.

A further object of this invention is concerned with the compensation of the frequency-dependent rotation of the plane of polarization in helically corrugated waveguides.

The present invention essentially is based on the recognition of the fact that fundamentally the direction of rotation or the shift of the polarization plane depends upon the sense of rotation of the helical corrugations in the waveguide.

According to the invention, two waveguides with the same cross-sectional shape, but having an opposite sense of rotation of the helical corrugations formed therein, are connected in series whereby the lengths are dimensioned in a manner that the rotation in the plane of polarization at the one end of one waveguide is compensated in the other waveguide by an amount corresponding to the difference between the angular orientation of the plane of polarization at the end of the one waveguide and the desired angular orientation at the end of the other waveguide.

Other objects of this invention will in part be obvious and in part hereinafter pointed out.

In the drawing, FIG. 1 is a side elevational view of a waveguide embodying the invention, with parts in section;

FIG. 2 is a side elevational view similar to that of FIG. 1, showing another embodiment of the invention; and FIG. 3 is a side elevational view similar to that of FIG. 1, showing a further embodiment of the invention.

Referring to FIG. 1, there is shown a waveguide 10 embodying the invention, which comprises helically corrugated sections 12 and 12′ interconnected by an uncorrugated, smooth walled section 14. The helical corrugations in section 12 have a counterclockwise sense of rotation in progressing from the outer end 16 of section 12 to the point 18 at the juncture of sections 12, 14. The helical corrugations in section 12′ have a clockwise sense of rotation in progressing from outer end 16′ of section 12′ to the point 18′ at the juncture of sections 12′, 14.

Accordingly, polarized electromagnetic waves introduced into end 16 of waveguide 10 will have its plane of polarization rotated counterclockwise while travelling in section 12 and rotated clockwise while travelling in section 12′.

The axial extent of sections 12 and 12′ will now be discussed to indicate how section 12′ can compensate for the rotation of the plane of polarization introduced by section 12.

Viewing a waveguide of selected dimensions for use with a certain operating frequency or operating wavelength, and taking into consideration that the rotation of the plane of polarization amounts to 180° within an axial length of L meters; considering further that the plane of polarization of the electromagnetic wave is supposed to have the same angular orientation at the end of the waveguide as it had at the entrance thereof; and assuming that the length of the waveguide expressed as $l+l'$ where $l$ is the length of section 12 and $l'$ is the length of section 12′, is not greater than the shortest possible distance between the ends of the waveguide, it is necessary then (disregarding the trivial case where $l+l'=L$) to differentiate between the cases $l+l'<L$ and $l+l'>L$.

In the case where $l+l'>L$, only that part of the rotation of the plane of polarization is to be compensated for, which is caused by that half of the partial length by which $l+l'$ is larger than a whole number multiple of L, i.e. $(l+l')-nL$. The other half of the partial length serves for phase compensation. In the case where $l+l'<L$, however, the entire length must be divided into equal halves, in which case the effect of one is compensated by the other.

The situation may be generalized as follows:
(1) If the section 12 has an axial length $l=nL+e$, where $n$ is zero or any integer and $e$ is a length less than L; and
(2) the section 12′ has an axial length $l'=mL+e'$, where $m$ is zero or any integer and $e'$ is a length less than L; then
(3) $l=l'$ or $nL+e=mL+e'$.

If the aforementioned procedure is altered to transmit waves of different frequencies, it is necessary, independent of the relation between $l+l'$ and L, to halve the entire length $l+l'$, i.e. $l=l'$.

It should be noted that by changing the lengths $l$ and $l'$, a desired relation of the plane of polarization can be achieved which is either frequency-dependent or frequency-independent.

A possibility for further compensation follows from the fact that—all existing conditions being the same—the plane of polarization is rotated less in a corrugated tube with a larger diameter than in one having a smaller diameter. In that case, the degree of compensation depends on the length as well as the diameter of the compensating section, i.e., electrical degrees per meter of length and electrical degrees per centimeter of diameter. Therefore, if a certain axial length $l'$ of waveguide section 12′ is required to compensate for a length $l$ of section 12 when both sections have the same diameter, then if the diameters of the sections are different and the diameter of section 12 is $d$ and the diameter of section 12′ is $d'=D \cdot d$, i.e., the diameter of section 12′ is D times greater than the diameter of section 12, then the length of section 12′ becomes D*l*′.

A junction with minimum reflections between two helically corrugated tubular sections having opposite senses of helical rotation is obtained when the depth of the corrugations starting at the opposite ends of the junction diminishes progressively over a given distance, preferably to a value of zero.

Accordingly, the waveguide 10 of FIG. 1 shows the depth of the corrugations progressively and continuously decreasing over an axial extent of two operating wavelengths 4L from point 17 to point 18 in section 12, and similarly from point 17′ to point 18′ in section 12′.

The waveguide 20 shown in FIG. 2 is similar to waveguide 10 of FIG. 1, except that the depth of the corrugations in section 12A decreases in a stepwise manner. Thus the corrugations are of constant depth in each of increments 21, 22, 23 and 24, but the corrugation depth of increment 22 is less than that of increment 21, etc. The axial extent of each of the increments 21–24 is preferably a quarter of an operating wavelength $L/2$, and there may be more than the four increments as shown in FIG. 2. Section 12B is treated in the same manner.

In FIG. 3, there is shown a waveguide 30 which is similar to waveguide 10 of FIG. 1, except that the diameter $d'$ of the right hand section 32B is D times larger than the diameter $d$ of the left hand section 32A. Therefore, the length of the right hand section 32B must be D times greater than the length $l'$ that section 32B would have if the diameters of the sections were equal. Although variation in the depths of the corrugations of waveguide 30 are shown as continuous, in a manner as indicated in FIG. 1, the depth variations may be of a stepwise nature as in waveguide 20 of FIG. 2.

The method of forming waveguides compensated for rotation of the plane of polarization is particularly simple when the corrugated sections of opposite sense of rotation are of equal diameter. In such case, a single smooth walled tube is first corrugated to provide helical corrugations of one direction of rotation and then corrugated to provide corrugations of the other direction of rotation.

As various changes might be made in embodiments of the invention herein described without departing from the spirit of the invention, it is understood that all matter herein shown or described shall be deemed illustrative and not limiting except as set forth in the appended claims.

What is claimed is:

1. A waveguide comprising a tubular member for transmitting polarized electromagnetic waves having axially related first and second sections, each of said sections being helically corrugated, the corrugations in the first section having one sense of rotation for rotating the plane of polarization of said electromagnetic waves moving through said first section in one direction, the corrugations of the second section having a sense of rotation opposite in direction to that of said first section for rotating the plane of polarization of said electromagnetic waves moving through said second section in the other direction.

2. A waveguide as in claim 1 wherein said first and second sections are of the same axial length.

3. A waveguide as in claim 1 wherein said first section has a cross-sectional diameter less than that of said second section, said first section having an axial length $l$ and said second section having an axial length $Dl'$, where D is the ratio of the second cross-sectional diameter to the first cross-sectional diameter, and $l'$ is the axial length of the second section when said cross-sectional diameters are equal.

4. A waveguide as in claim 1 wherein the depth of corrugations in each of the first and second sections progressively decrease from the outer ends of the respective sections to the inner ends thereof, and means interconnecting the inner ends of said first and second sections.

5. A waveguide as in claim 4 wherein the progressive decrease in depth of corrugations in each section is continuous.

6. A waveguide as in claim 4 wherein the progressive decrease in depth of corrugations in each section is stepwise.

7. A waveguide as in claim 4 wherein said interconnecting means is a smooth walled, uncorrugated section of said tubular member.

8. A waveguide for guiding electromagnetic waves having a given operating wavelength 2L comprising a tubular member including a first section having an axial length $l=nL+e$, where $n$ is zero or any integer and $e$ is less than L, and a second section having a length $l'=mL+e'$, where $m$ is zero or any integer and $e'=e$, said first section being helically corrugated in one direction for rotating the plane of polarization of the electromagnetic waves in one direction and said second section being helically corrugated in the opposite direction for rotating the plane of polarization of the electromagnetic waves in the opposite direction.

9. A waveguide as in claim 8 where $m$ is zero.

References Cited by the Examiner

UNITED STATES PATENTS

| 2,419,678 | 4/47 | Duenas et al. | 153—71 |
| 2,571,021 | 10/51 | Early | 333—95 |
| 2,986,169 | 5/61 | McCormick | 138—122 |
| 3,015,355 | 1/62 | Humphrey | 153—71 |

FOREIGN PATENTS

| 580,377 | 9/46 | Great Britain. |

HERMAN KARL SAALBACH, *Primary Examiner.*